United States Patent
Petrovic et al.

(10) Patent No.: US 9,484,807 B2
(45) Date of Patent: Nov. 1, 2016

(54) HIGH EFFICIENCY SWITCHED CAPACITOR VOLTAGE REGULATOR

(71) Applicant: Entropic Communications, LLC, Carlsbad, CA (US)

(72) Inventors: Branislav Petrovic, La Jolla, CA (US); Joseph Nabicht, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 217 days.

(21) Appl. No.: 13/952,308

(22) Filed: Jul. 26, 2013

(65) Prior Publication Data
US 2015/0028839 A1    Jan. 29, 2015

(51) Int. Cl.
| H02M 3/155 | (2006.01) |
| H02M 3/07 | (2006.01) |
| H02M 3/158 | (2006.01) |
| H02M 1/00 | (2006.01) |

(52) U.S. Cl.
CPC ............. *H02M 3/07* (2013.01); *H02M 3/1588* (2013.01); *H02M 2001/007* (2013.01); *H02M 2001/0045* (2013.01); *Y02B 70/1466* (2013.01)

(58) Field of Classification Search
CPC .................................................... H02M 3/155
USPC ....................................................... 363/59, 60
See application file for complete search history.

(56) References Cited

U.S. PATENT DOCUMENTS

| | | | | |
|---|---|---|---|---|
| 5,532,916 A * | 7/1996 | Tamagawa | ............... | H02M 3/07 307/110 |
| 6,084,789 A * | 7/2000 | Van Lieshout | ......... | H02M 3/07 307/110 |
| 6,445,623 B1 * | 9/2002 | Zhang | .................... | G11O 5/145 365/189.11 |
| 6,643,151 B1 * | 11/2003 | Nebrigic | ............. | H01M 6/5044 307/110 |
| 7,851,946 B2 * | 12/2010 | Oyama et al. | ................ | 307/109 |
| 2002/0154109 A1 * | 10/2002 | Ikeda | ................... | G09G 3/3696 345/211 |
| 2006/0146583 A1 * | 7/2006 | Naka et al. | ...................... | 363/59 |
| 2007/0091655 A1 * | 4/2007 | Oyama et al. | .................. | 363/59 |
| 2008/0013349 A1 * | 1/2008 | Yanagida et al. | ............... | 363/60 |
| 2009/0273955 A1 * | 11/2009 | Tseng et al. | .................... | 363/60 |
| 2010/0085786 A1 * | 4/2010 | Chiu et al. | ...................... | 363/59 |
| 2011/0317456 A1 * | 12/2011 | Tseng et al. | .................... | 363/60 |
| 2012/0326771 A1 * | 12/2012 | MacFarlane | ............ | H02M 3/07 327/536 |
| 2014/0104896 A1 * | 4/2014 | Tallam | ................ | H02M 5/4585 363/37 |
| 2015/0028839 A1 * | 1/2015 | Petrovic et al. | .............. | 323/311 |

OTHER PUBLICATIONS

PCT International Search Report, International Application No. PCT/US14/47988, filing date of Jul. 24, 2014, 2 pages.

* cited by examiner

*Primary Examiner* — Jeffrey Sterrett
(74) *Attorney, Agent, or Firm* — McAndrews Held & Malloy

(57) ABSTRACT

A high efficiency switched capacitor voltage regulator circuit and a method of efficiently generating an enhanced voltage from an input voltage supply. An input voltage Vin from a main power source is the base voltage to be pumped to an enhanced voltage. Auxiliary voltage sources V1 and V2 are from sources (or grounds) available in the system. During phase 1 of a clock signal, a pump capacitor is charged to $\Delta V = V2 - V1$. During phase 2 of the clock signal, the pump capacitor is connected in series between Vin and an output capacitor, resulting in the sum voltage $V = Vin + \Delta V$ being generated across the output capacitor.

17 Claims, 5 Drawing Sheets

HIGH EFFICIENCY SWITCHED CAPACITOR VOLTAGE REGULATOR

BACKGROUND (1) Technical Field

This invention relates to electronic circuits, and more particularly to voltage regulator circuits.

(2) Background

In electronic systems, particularly those systems having a single voltage supply, there is often a need in some part of the component circuitry for a voltage that is higher than the supply voltage; for example, a particular system may have a 4.5V power supply, but some portion of the component circuitry may need an 8V supply (an enhanced voltage). A conventional approach to supplying an enhanced voltage is to include in the system a switched capacitor voltage multiplier (sometimes called a charge pump), and then down-regulate the output voltage from the voltage multiplier to the desired output level.

For example, FIG. 1a is a circuit diagram of a prior art switched capacitor voltage doubler followed by a down-regulator circuit. FIG. 1b is a timing diagram of a two-phase clock signal 101 used in conjunction with the circuit shown in FIG. 1a. In the illustrated circuit, the input voltage Vin is doubled to approximately 2*Vin, then down regulated to Vout. In particular, a pump capacitor Cp 100 is first charged to Vin during phase 1 of the clock 101; during phase 1, the switches 102, 104 are in the position shown in FIG. 1a. During phase 2 of the clock 101, the switches 102, 104 are flipped so as to place pump capacitor Cp 100 in series with a holding capacitor C 106. This action adds the voltage from pump capacitor Cp 100 (approximately equal to Vin) in series with the voltage on the holding capacitor C 106 (which is also approximately equal to Vin in steady-state), creating a voltage V at the holding capacitor C 106 that is approximately double the input voltage Vin. Thereafter, a conventional linear regulator circuit 108 may be used to regulate V down to a desired value Vout (<2*Vin). An output capacitor Co 110 may be provided to filter voltage ripple out of Vout.

As an alternative to the linear regulator circuit 108, lossy switches (not shown) may be used to absorb surplus voltage in order to generate the desired value Vout by controlling the ON resistance of one or more lossy switches.

The phases of the clock signal 101 are distinct and preferably configured so that adjacent switches in FIG. 1a operate with proper phasing so as to charge and discharge the various capacitances as described above; there are multiple ways known in the art to achieve such a configuration.

The nominal efficiency of the prior art circuit shown in FIG. 1a is equal to Vout/(2*Vin), ignoring component losses. In cases where Vout is close to double the value of Vin, the conventional circuit approach shown in FIG. 1a is reasonably efficient. Thus, if Vout=8V, and Vin=4.5V, then the efficiency is 8/9, or about 89%.

However, there are often electronic systems where a desired Vout is only slightly higher than the Vin value (e.g., Vin=4.5V, Vout=5V). Thus, for the circuit shown in FIG. 1a, if Vout=5V and Vin=4.5V, then the efficiency is at best 5/9, or about 56%. This efficiency value is further reduced by circuit losses, resulting in an achievable efficiency that typically is less than 50%. Accordingly, in such cases, the prior art circuit shown in FIG. 1a results in very low efficiency, wasting power, often in systems where power savings are important (e.g., cell phones) or where excess generated heat is undesirable (e.g., set top boxes).

There is thus a need for a voltage regulator circuit for efficiently generating a slightly enhanced voltage from an input power supply. The present invention addresses this need.

SUMMARY OF THE INVENTION

The invention encompasses a high efficiency switched capacitor voltage regulator circuit and a method of efficiently generating an enhanced voltage from an input voltage supply.

An input voltage Vin from a main power source is the base voltage to be pumped to an enhanced voltage value. Auxiliary voltage sources V1 and V2 are from sources available in the overall system in which the switched capacitor voltage regulator is used; they may be, for example, the result of voltage conversions or regulations occurring in other parts of an overall system, or may be a voltage supplied from an external low voltage supply (e.g., a battery). Notably, either of V1 or V2 may be ground (i.e., 0 volts).

In operation, a first pair of switches are open during phase 1 of a clock signal, while a second pair of switches are closed (i.e., the switch pairs are complementary), resulting in a pump capacitor being charged to $\Delta V = V2 - V1$. During phase 2 of the clock signal, the first pair of switches are closed, while the second pair of switches are open, connecting the pump capacitor in series between Vin and a charge holding (output) capacitor. Accordingly, $\Delta V$ is in series with Vin and the sum voltage $V = Vin + \Delta V$ is generated at the circuit output as voltage Vout. The pump capacitor discharges, charging the output holding capacitor and supplying current to an output load. During the next phase 1 of the clock signal, the pairs of switches flip back to the first state described above, the pump capacitor is recharged to $\Delta V$, and the cycle repeats. If desired, post-generation regulation of Vout may be added, such as by use of a low-dropout (LDO) voltage regulator circuit.

By a suitable selection of V1 and V2, the output voltage Vout can be enhanced over Vin by either V1 (V2=0), or by V2 (V1=0), or by some value in between V1 and V2. Further, because $\Delta V$ is derived as the difference of V1 and V2, $\Delta V$ can be either positive or negative, depending on the values of the two source voltages. Thus, if Vout is higher than Vin, then $\Delta V$ is positive, and if Vout is lower than Vin, then $\Delta V$ is negative. Because $\Delta V$ can be negative, Vout can be set at less than Vin if desired. For example, this can be used to power a DRAM circuit at 1.35V by first generating 1.7V as a difference between 5V in and an auxiliary 3.3V, then regulating the 1.7V down to a Vout of 1.35V, as further described below.

The nominal efficiency of one embodiment of the switched capacitor regulator is equal to $Vout/(Vin + \Delta V)$, ignoring component losses. This ratio is based on peak voltage, not average voltage; using the average voltage would give a higher efficiency ratio.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1b is a timing diagram of a two-phase clock signal used in conjunction with the circuit shown in FIG. 1a.

FIG. 2b is a timing diagram of a two-phase clock signal used in conjunction with the circuit shown in FIG. 2a.

Like reference numbers and designations in the various drawings indicate like elements.

DETAILED DESCRIPTION OF THE INVENTION

The invention encompasses a high efficiency switched capacitor voltage regulator circuit and a method of efficiently generating an enhanced voltage from an input voltage supply.

Figure 1A:
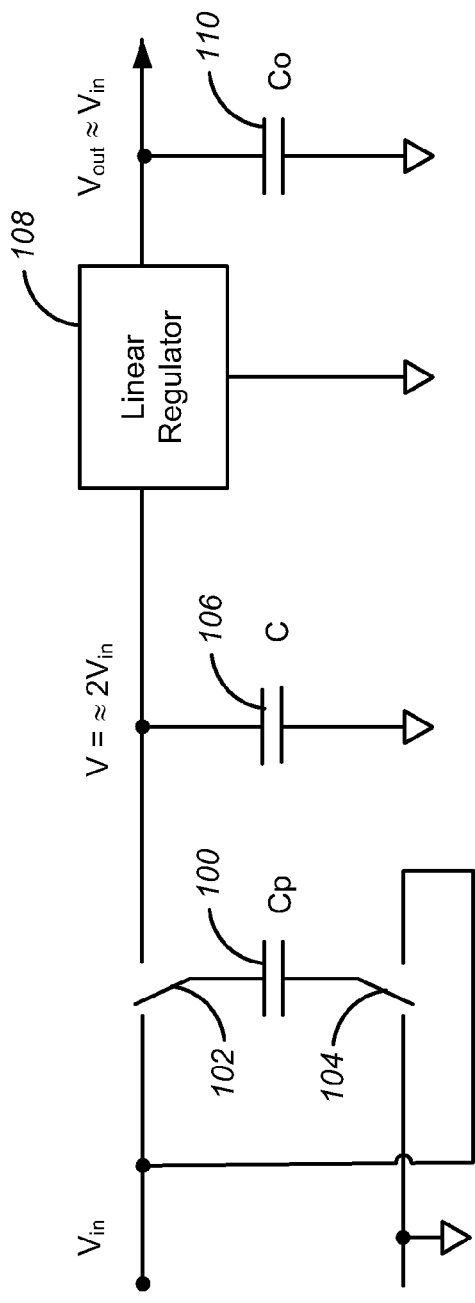
FIG. 1a is a circuit diagram of a prior art switched capacitor voltage doubler followed by a down-regulator circuit.
Figure 1B:
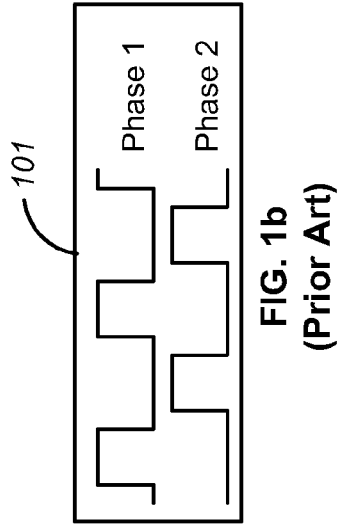
Figure 2A:
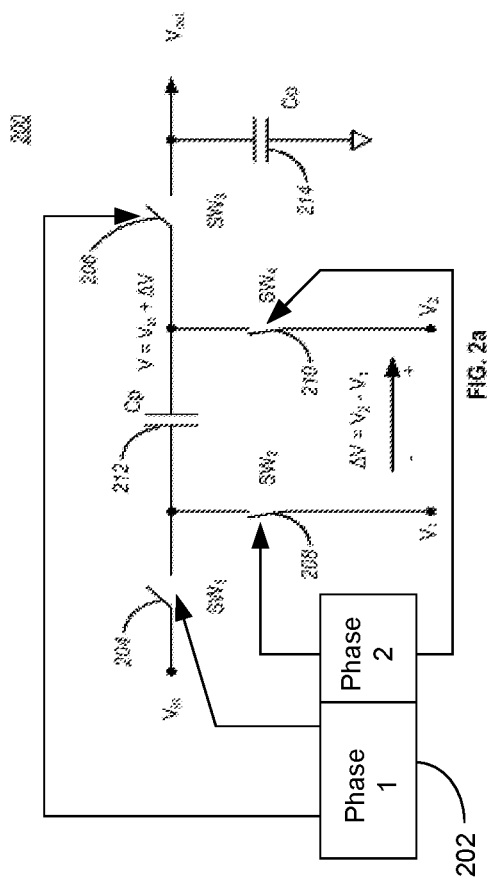
FIG. 2a is a circuit diagram of a switched capacitor regulator using at least one auxiliary voltage.
Figure 2B:
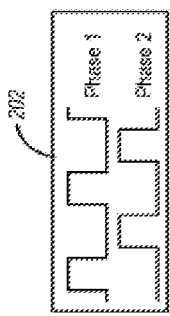

FIG. 2a is a circuit diagram of a switched capacitor regulator 200 using at least one auxiliary voltage, as one embodiment of the invention. FIG. 2b is a timing diagram of a two-phase clock signal 202 used in conjunction with the circuit 200 shown in FIG. 2a. The input voltage Vin is from a main power source for the circuit, and is the base voltage to be pumped to an enhanced voltage value. Auxiliary voltage sources V1 and V2 are from sources available in the overall system in which the switched capacitor regulator is used; they may be, for example, the result of voltage conversions or regulations occurring in other parts of an overall system, or may be a voltage supplied from an external low voltage supply (e.g., a battery). Notably, either of V1 or V2 may be ground (i.e., 0 volts).

In operation, switches SW1 204 and SW3 206 are open during phase 1 of the clock signal 202, while switches SW2 208 and SW4 210 are closed (i.e., the switch pairs are complementary), resulting in a pump capacitor Cp 212 being charged to $\Delta V=V2-V1$.

During phase 2 of the clock signal 202, switches SW1 204 and SW3 206 are closed, while switches SW2 208 and SW4 210 are open, connecting pump capacitor Cp 212 in series between Vin and a charge holding (output) capacitor Co 214. Accordingly, $\Delta V$ is in series with Vin and the sum voltage $V=Vin+\Delta V$ is generated at the circuit output as voltage Vout. The pump capacitor Cp 212 discharges, charging the holding capacitor Co 214 and supplying current to an output load.

During the next phase 1 of the clock signal 202, the switches flip back to the first state described above, the pump capacitor Cp 212 is recharged to $\Delta V$, and the cycle repeats. If desired, post-generation regulation of Vout may be added (not shown), such as by use of a low-dropout (LDO) voltage regulator circuit.

By a suitable selection of V1 and V2, the output voltage Vout can be enhanced over Vin by either V1 (V2=0), or by V2 (V1=0), or by some value in between V1 and V2. Further, because $\Delta V$ is derived as the difference of V1 and V2, $\Delta V$ can be either positive or negative, depending on the values of the two source voltages. Thus, if Vout is higher than Vin, then $\Delta V$ is positive, and if Vout is lower than Vin, then $\Delta V$ is negative. Because $\Delta V$ can be negative, Vout can be set at less than Vin if desired. For example, this can be used to power a DRAM circuit at 1.35V by first generating 1.7V as a difference between 5V in and an auxiliary 3.3V, then regulating the 1.7V down to a Vout of 1.35V, as further described below.

The nominal efficiency of the illustrated switched capacitor regulator 200 is equal to Vout/(Vin+$\Delta V$), again ignoring component losses. Thus, for the circuit shown in FIG. 2a, if Vout=5V, Vin=4.5V, and $\Delta V$=1V, then the efficiency is 91% (this compares with about 56% for the prior art). Note that this ratio is based on peak voltage, not average voltage; using the average voltage would give a higher efficiency ratio.

As another example, if Vin is about 5V (it may vary above that value, thus needing regulation), V1=0 (ground), and V2=1V, then Vout=5+1=6V, which can be regulated down to a final regulated Vout of 5V. In this case, the nominal efficiency is 5/6=83% (this compares with about 50% for the prior art).

As another example (mentioned above), in which $\Delta V$ is negative, if Vin=5V, V1=3.3V, and V2=0 (ground), then Vout=5−3.3=1.7. This value may be further down-regulated by an LDO regulator circuit to obtain 1.35V, a value often needed in some systems, such as to power a DRAM. Conversely, a Vout of 3.3V can be derived by regulating down a difference of 5V−1.35V=3.65V (that is, the 3.65V is regulated down to 3.3V). Of course, the output of an LDO regulator circuit in accordance with the present invention can be used as the V1 or V2 voltage source of another such LDO regulator circuit.

The switches shown in FIG. 2a need not all be implemented in the same circuit. In particular, switches exist in some external circuits (such as the DC/DC converter IC part RT8012 from Richtek Technology Corporation) that may be shared or used for "free" (i.e., no extra cost arises by having to fabricate the switches if they exist in another component in the overall system).

Figure 3:
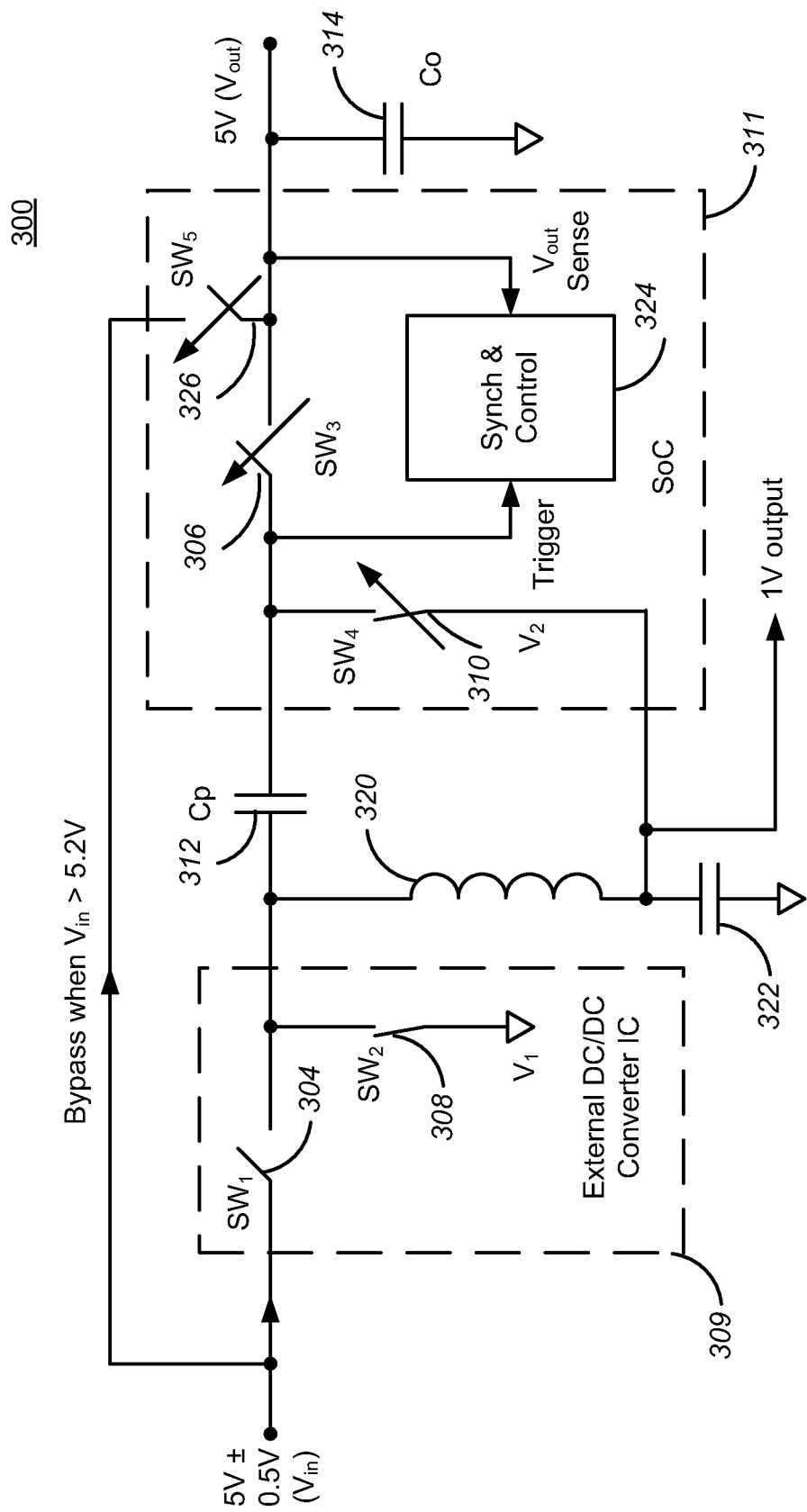
FIG. 3 is a circuit diagram of a switched capacitor regulator using at least one auxiliary voltage and utilizing externally available switches to generate an enhanced output voltage.

FIG. 3 is a circuit diagram of a switched capacitor regulator 300 using at least one auxiliary voltage and utilizing externally available switches to generate an enhanced output voltage. In particular, in this example, switches SW1 304 and SW2 308 (corresponding to switches SW1 204 and SW2 208 in FIG. 2a) reside in an external DC/DC converter IC 309, while switches SW3 306 and SW4 310 (corresponding to switches SW3 206 and SW4 210 in FIG. 2a) are fabricated as part of a system-on-a-chip (SoC) integrated circuit 311. The inductor 320 and capacitor 322 work in conjunction with the converter IC 309, as standard parts of the external DC/DC converter, providing regulated output voltage (1V output as shown in FIG. 3) intended for use elsewhere in the system. In the illustrated embodiment, this 1V output can be taken advantage of and used as the auxiliary voltage (corresponding to V2 in FIG. 2) for the switched-capacitor regulator 300. External capacitors Cp 312 and Co 314 (corresponding to capacitors Cp 212 and Co 214 in FIG. 2a) are the only necessary additional components.

The operation of the switched capacitor regulator 300 is essentially the same as the operation described above for the switched capacitor regulator 200 of FIG. 2a; in this example, the output voltage Vout is 5V and the input voltage Vin can be slightly below or above 5V. However, since switches external to the SoC 311 are used, a synchronization and control circuit 324 is provided to detect the phase of the voltage changes in the circuit and synchronize the states (ON or OFF) of switches SW3 306 and SW4 310 to the appropriate states of switches SW1 304 and SW2 308, in essence dynamically generating a two-phase clock signal. This can be done, for example, by detecting voltage differences across switches SW3 306 and/or SW4 310 (thus in essence detecting the waveform edge off of capacitor Cp 312, for example using voltage comparators across switches SW3 306 and SW4 310) and individually triggering (i.e., controlling the ON/OFF position of) those switches to a selected state based on set values for such differences. Alternatively, a digital clock recovery/tracking and timing may be used to control the switches. As another alternative, if the internal two-phase clock used by the external circuit 309 for switching SW1 304 and SW2 308 is externally accessible, that same clock signal may be used for switching in the SoC 311. The principal criteria are that the phases of the clock signal are distinct and preferably configured so that adjacent switches operate with proper phasing so as to charge and discharge the various capacitances as described above.

The example in FIG. 3 also shows an auxiliary switch SW5 326 that bypasses the main switched capacitor regulator circuit when Vin is high enough so that Vout can be simply regulated down directly from the input voltage (for example, when Vin exceeds a (programmable) value of 5.2V, as determined by the synchronization and control circuit 324). In this mode, SW3 306 is open and SW5 326 acts as a variable duty cycle and/or ON resistance switcher/regulator (or simply as an ON switch, if no regulation required), in known fashion. Accordingly, the synchronization and control circuit 324 controls switches SW3 306, SW4 310, and SW5 326 to provide closed loop voltage regulation.

Figure 4:
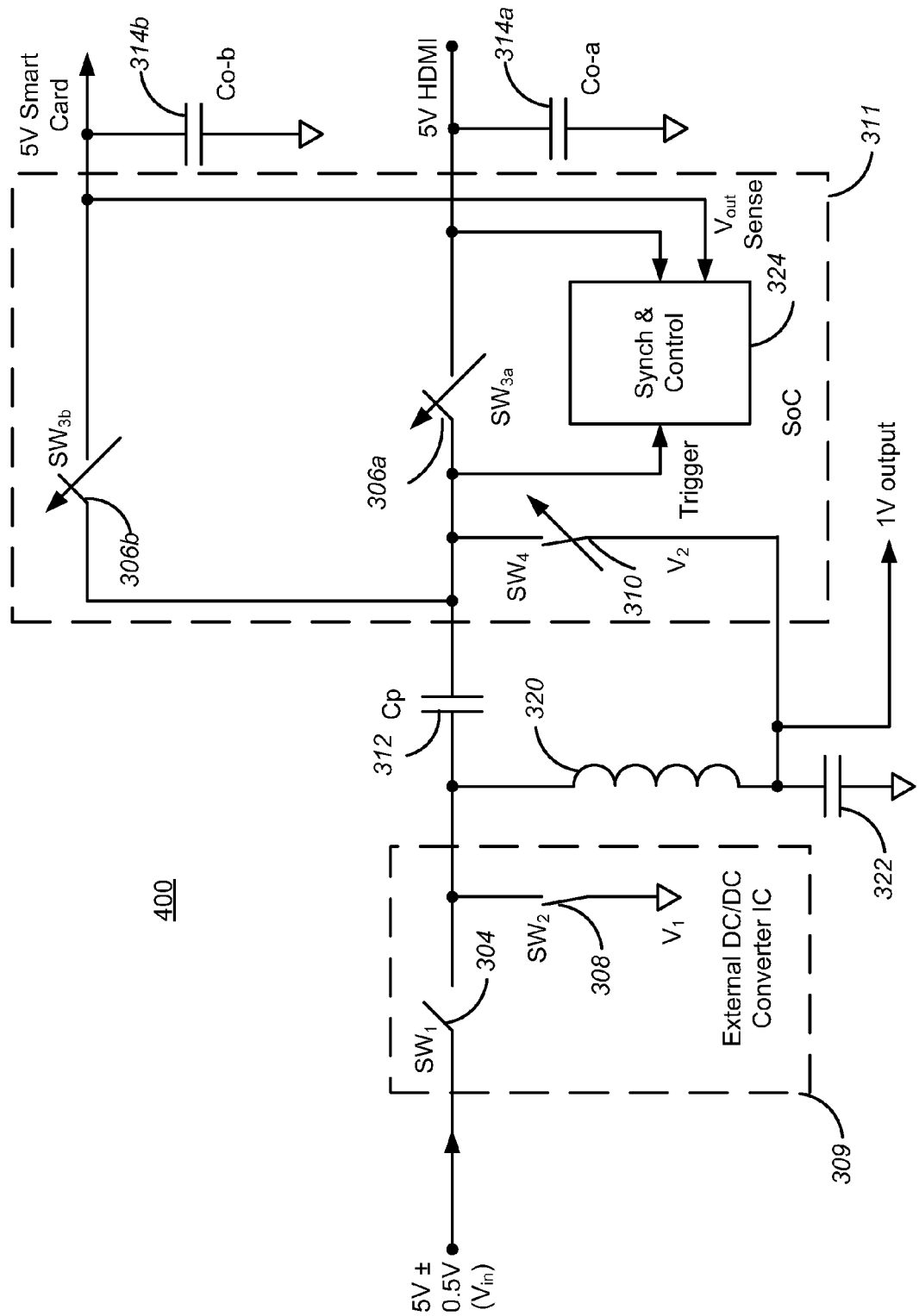
FIG. 4 is a circuit diagram of a switched capacitor regulator using at least one auxiliary voltage and utilizing externally available switches to generate multiple enhanced output voltages.

Other circuitry may be added to the switched capacitor regulator 300 in known fashion. For example, a capacitor (not shown) may be connected from the input to the output to improve ripple filtering. As another example, in an application requiring power for 5V "SmartCard" and HDMI ports in television set-top boxes, two separate output sections may be provided. FIG. 4 is a circuit diagram of a switched capacitor regulator 400 using at least one auxiliary voltage and utilizing externally available switches to generate multiple enhanced output voltages. The circuitry is essentially the same as shown for the switched capacitor regulator 300 shown in FIG. 3, with the exception that switch SW3a 306a and output capacitor Co-a 314a (corresponding to switch SW3 306 and output capacitor Co 314 in FIG. 3), which provide a first output (here, for an HDMI port), are replicated in a parallel circuit comprising switch SW3b 306b and output capacitor Co-b 314b, which provide a second output (here, for a SmartCard port). Each output has a separate switch (SW3a 306a, SW3b 306b) for mutual isolation. As would be apparent to one skilled in the art, additional output sections may also be implemented in like fashion. Additionally, all switches may be variable ON resistance FETs for regulation and/or current limiting purposes, as would be clear to one of skill in the art.

Figure 5:
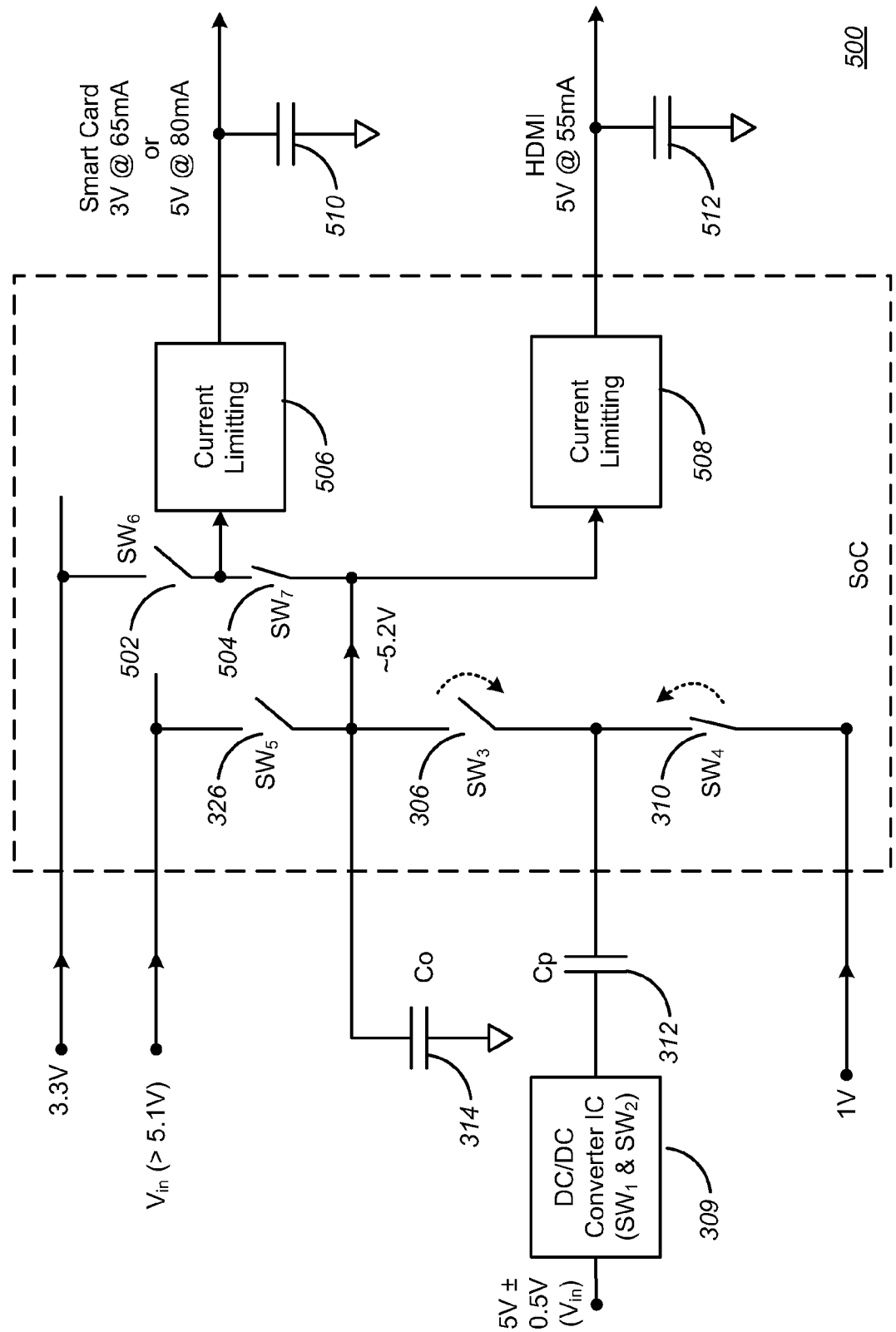
FIG. 5 is a circuit diagram of a switched capacitor regulator using multiple auxiliary voltages to generate multiple enhanced output voltages.

As another example, FIG. 5 is a circuit diagram of a switched capacitor regulator 500 using multiple auxiliary voltages to generate multiple enhanced output voltages. An external DC/DC converter IC 309, an external pump capacitor Cp 312, switches SW3 306, SW4 310, and SW5 326, and output capacitor Co 510 function as in FIG. 3 (a synchronization and control circuit, not shown, is implied). Switch SW5 326 is used to bypass the main switched capacitor regulator circuit if the input voltage is above a specified threshold (e.g., >~5.1V) and in a standby mode of the system. Bypass switches SW6 502 and SW7 504 allow a lower external voltage (e.g., 3.3V, down-regulated to 3V for certain SmartCards) to be provided to a selected output port if required. Current limiters 506, 508 (such as low-dropout (LDO) regulators) and filter capacitors 510, 512 also may be provided, in known fashion.

The switches shown in FIG. 2a and FIGS. 3-5 may be, for example, field effect transistors (FETs) selected from the many variants available, such as IGFETs, MOSFETs, and the like. The various capacitors shown in these figures may be implemented in known manner. The output voltage Vout can be regulated by varying the duty cycle of one or more of the illustrated switches, and/or by controlling the ON resistance of one or more switches.

The invention also encompasses several methods of efficiently generating an enhanced voltage from an input voltage supply. In one embodiment, the method includes:
coupling a voltage differential across a pump capacitor during a first clock phase, thereby charging the pump capacitor to a voltage $\Delta V$; and
coupling a primary voltage Vin to the pump capacitor during a second clock phase and coupling the pump capacitor to at least one holding capacitor, thereby charging the at least one holding capacitor to an output voltage Vout approximately equal to Vin+$\Delta V$.

The above method may further include providing the voltage differential from at least two separate voltage sources V1, V2, such that $\Delta V$=V2−V1. Additionally, one of V1 or V2 may be ground. The above method also may include providing a bypass switch for coupling the primary voltage Vin to the at least one holding capacitor as the output voltage Vout if the primary voltage Vin exceeds a selected threshold value.

In another embodiment, the method includes:
coupling a first switch between an input voltage Vin and a first node of a pump capacitor;
coupling a second switch between a first auxiliary voltage source and the first node of the pump capacitor;
coupling at least one third switch between a second node of the pump capacitor and at least one corresponding output capacitor;
coupling a fourth switch between a second auxiliary voltage source and the second node of the pump capacitor;
opening the first and third switches during a first clock phase, and closing the second and fourth switches during the first clock phase, thereby charging the pump capacitor to a voltage $\Delta V$ equal approximately to the second auxiliary voltage minus the first auxiliary voltage; and
closing the first and third switches during a second clock phase, and opening the second and fourth switches during the second clock phase, thereby coupling the input voltage Vin to the pump capacitor and coupling the pump capacitor to at least one output capacitor, thereby charging at least one output capacitor to an output voltage Vout approximately equal to Vin+$\Delta V$.

The above method further may include repeating the process during subsequent first and second phases. Additionally, one of the auxiliary voltage sources may be ground. The above method also may include providing a bypass switch for coupling the input voltage Vin to the at least one output capacitor as the output voltage Vout if the input voltage Vin exceeds a selected threshold value.

A number of embodiments of the invention have been described. It is to be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the following claims, and that other embodiments are within the scope of the claims.

What is claimed is:

1. A switched capacitor voltage regulator circuit, including:
   (a) a pump capacitor having a first node and a second node;
   (b) at least one output capacitor;
   (c) a first switch coupled between an input voltage Vin and the first node of the pump capacitor;
   (d) a second switch coupled between a first auxiliary voltage source and the first node of the pump capacitor, wherein the first auxiliary voltage source is independent of Vin;
   (e) at least one third switch between the second node of the pump capacitor and at least one corresponding output capacitor;
   (f) a fourth switch coupled between a second auxiliary voltage source and the second node of the pump capacitor, wherein the second auxiliary voltage source is independent of Vin; and
   (g) a clock signal, electrically coupled to each of the first, second, third, and fourth switches, for generating a first clock phase and a second clock phase;
   wherein during the first clock phase, the first and third switches are open, and the second and fourth switches are closed, thereby charging the pump capacitor to a voltage ΔV equal approximately to the second auxiliary voltage minus the first auxiliary voltage; and
   wherein during a second clock phase, the first and third switches are closed, and the second and fourth switches are open, thereby coupling the input voltage Vin to the pump capacitor and coupling the pump capacitor to at least one output capacitor, thereby charging at least one output capacitor to an output voltage Vout approximately equal to Vin+ΔV.

2. The switched capacitor voltage regulator circuit of claim 1, further including a bypass switch for coupling the input voltage Vin to the at least one output capacitor as the output voltage Vout if the input voltage Vin exceeds a selected threshold value.

3. The switched capacitor voltage regulator circuit of claim 1, wherein one of the first auxiliary voltage or the second auxiliary voltage is ground.

4. A method for generating an enhanced voltage, including:
   (a) coupling a voltage differential across a pump capacitor during a first clock phase, thereby charging the pump capacitor to a voltage ΔV; and
   (b) coupling a primary voltage Vin to the pump capacitor during a second clock phase and coupling the pump capacitor to at least one holding capacitor, thereby charging the at least one holding capacitor to an output voltage Vout approximately equal to Vin+ΔV, wherein the voltage differential is generated by first and second auxiliary voltages sources independent of Vin.

5. The method of claim 4, further including providing the voltage differential from at least two separate voltage sources V1, V2, such that ΔV=V2−V1.

6. The method of claim 5, wherein one of V1 or V2 is ground.

7. The method of claim 4, further including providing a bypass switch for coupling the primary voltage Vin to the at least one holding capacitor as the output voltage Vout if the primary voltage Vin exceeds a selected threshold value.

8. A method for generating an enhanced voltage, including:
   (a) coupling a first switch between an input voltage Vin and a first node of a pump capacitor;
   (b) coupling a second switch between a first auxiliary voltage source and the first node of the pump capacitor, wherein the first auxiliary voltage source is independent of Vin;
   (c) coupling at least one third switch between a second node of the pump capacitor and at least one corresponding output capacitor;
   (d) coupling a fourth switch between a second auxiliary voltage source and the second node of the pump capacitor, wherein the second auxiliary voltage source is independent of Vin;
   (e) opening the first and third switches during a first clock phase, and closing the second and fourth switches during the first clock phase, thereby charging the pump capacitor to a voltage ΔV equal approximately to the second auxiliary voltage minus the first auxiliary voltage; and
   (f) closing the first and third switches during a second clock phase, and opening the second and fourth switches during the second clock phase, thereby coupling the input voltage Vin to the pump capacitor and coupling the pump capacitor to at least one output capacitor, thereby charging at least one output capacitor to an output voltage Vout approximately equal to Vin+ΔV.

9. The method of claim 8, further including providing a bypass switch for coupling the input voltage Vin to the at least one output capacitor as the output voltage Vout if the input voltage Vin exceeds a selected threshold value.

10. The method of claim 8, wherein one of the first auxiliary voltage or the second auxiliary voltage is ground.

11. A switched capacitor voltage regulator circuit for generating an enhanced voltage, including:
    (a) means for coupling a voltage differential across a pump capacitor during a first clock phase, thereby charging the pump capacitor to a voltage ΔV; and
    (b) means for coupling a primary voltage Vin to the pump capacitor during a second clock phase and coupling the pump capacitor to at least one holding capacitor, thereby charging the at least one holding capacitor to an output voltage Vout approximately equal to Vin+ΔV, wherein the voltage differential is generated by first and second auxiliary voltages sources independent of Vin.

12. The switched capacitor voltage regulator circuit of claim 11, further including means for providing the voltage differential from at least two separate voltage sources V1, V2, such that ΔV=V2−V1.

13. The switched capacitor voltage regulator circuit of claim 12, wherein one of V1 or V2 is ground.

14. The switched capacitor voltage regulator circuit of claim 11, further including means for providing a bypass switch for coupling the primary voltage Vin to the at least one holding capacitor as the output voltage Vout if the primary voltage Vin exceeds a selected threshold value.

15. A switched capacitor voltage regulator circuit for generating an enhanced voltage, including:
    (a) means for coupling a first switch between an input voltage Vin and a first node of a pump capacitor;

(b) means for coupling a second switch between a first auxiliary voltage source and the first node of the pump capacitor, wherein the first auxiliary voltage source is independent of Vin;

(c) means for coupling at least one third switch between a second node of the pump capacitor and at least one corresponding output capacitor;

(d) means for coupling a fourth switch between a second auxiliary voltage source and the second node of the pump capacitor, wherein the second auxiliary voltage source is independent of Vin;

(e) means for opening the first and third switches during a first clock phase, and closing the second and fourth switches during the first clock phase, thereby charging the pump capacitor to a voltage $\Delta V$ equal approximately to the second auxiliary voltage minus the first auxiliary voltage; and (f) means for closing the first and third switches during a second clock phase, and opening the second and fourth switches during the second clock phase, thereby coupling the input voltage Vin to the pump capacitor and coupling the pump capacitor to at least one output capacitor, thereby charging at least one output capacitor to an output voltage Vout approximately equal to Vin+ $\Delta V$.

16. The switched capacitor voltage regulator circuit of claim 15, further including means for providing a bypass switch for coupling the input voltage Vin to the at least one output capacitor as the output voltage Vout if the input voltage Vin exceeds a selected threshold value.

17. The switched capacitor voltage regulator circuit of claim 15, wherein one of the first auxiliary voltage or the second auxiliary voltage is ground.

* * * * *